Figure 1:
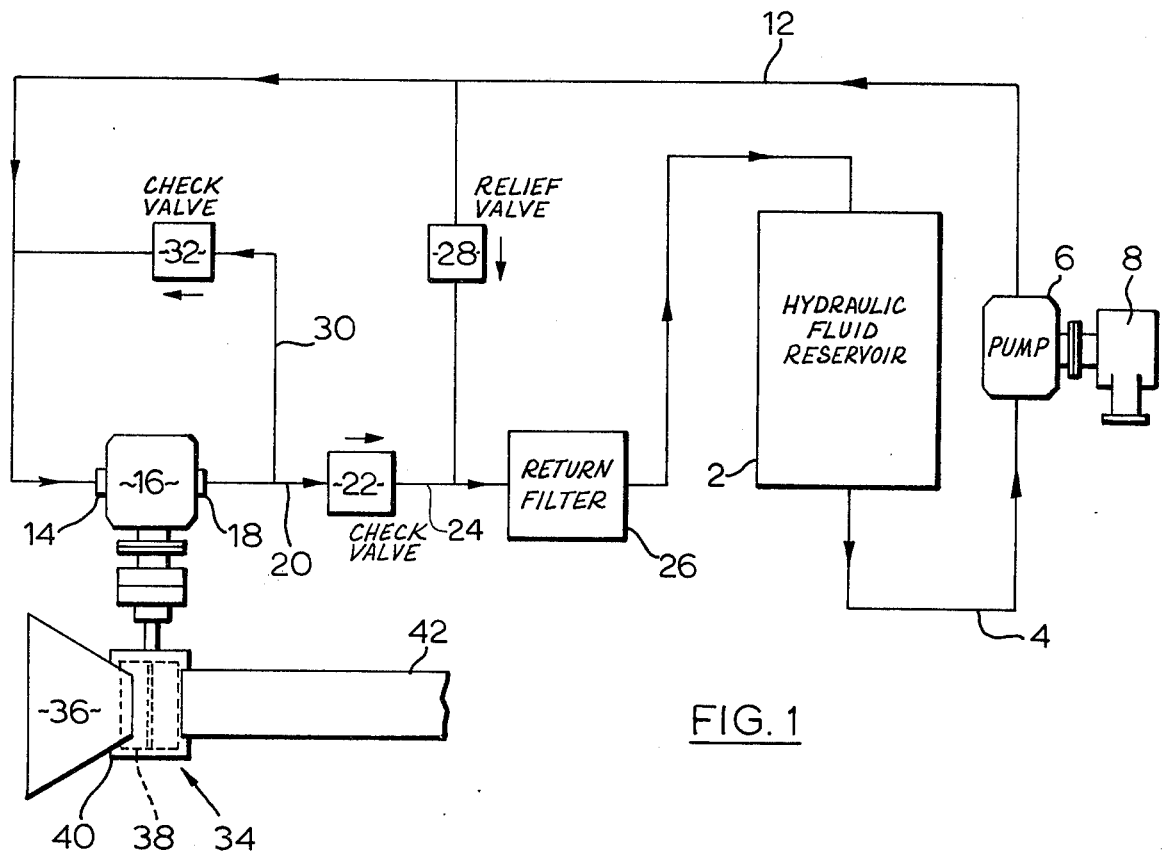

United States Patent [19]

Stan et al.

[11] 3,937,016
[45] Feb. 10, 1976

[54] HYDRAULIC SAFETY CIRCUIT

[76] Inventors: Gerald N. Stan, 1157 Shamir Crescent, Mississauga; Leslie Toth, 41 Longhope Place, Willowdale; John E. Rollinson, 7 Durban Road, Toronto 18, all of Ontario, Canada

[22] Filed: Oct. 8, 1974

[21] Appl. No.: 513,010

[52] U.S. Cl. .................. 60/325; 60/459; 60/461; 60/468
[51] Int. Cl.² ........................................ F15B 15/18
[58] Field of Search ............ 60/325, 413, 453, 459, 60/461, 464, 468, 477, 494, 905; 91/420

[56] References Cited
UNITED STATES PATENTS

| | | | |
|---|---|---|---|
| 2,164,596 | 7/1939 | Simonds | 60/905 X |
| 2,232,428 | 2/1941 | Benedek | 60/494 X |
| 3,570,245 | 3/1971 | Van Der Linde | 60/468 X |

Primary Examiner—Edgar W. Geohegan

[57] ABSTRACT

A hydraulic safety circuit which keeps a hydraulic motor supplied with fluid during the interval when the motor coasts to a stop following shut off of its source of driving fluid. The circuit includes a conduit extending between the motor outlet and the motor inlet, with a check valve arrangement which shuts off normal fluid flow from the motor outlet to the fluid reservoir when the driving pump is shut off, and which instead diverts the fluid through the above noted conduit back to the motor inlet. This permits fluid to circulate through the motor as the motor coasts to a stop, preventing dry coasting and consequent possible burnout. The invention is particularly applicable to a wood chipper, where a heavy rotor (containing wood chipping blades) is connected to the motor and causes the motor to coast for an appreciable interval after the pump is shut off.

5 Claims, 2 Drawing Figures

HYDRAULIC SAFETY CIRCUIT

This invention relates to a hydraulic safety circuit for a hydraulic motor. More particularly, it relates to a circuit for reducing the likelihood of motor burnout during the time when the motor coasts to a stop following shut off of its source of driving fluid.

The invention is particularly applicable to a brush chipper and will be described in that connection. A brush chipper is a device commonly used by public utilities to reduce branches and even small logs to wood chips. The chipper includes a heavy rotor with blades which rotates at a substantial speed, and an inlet through which brush can be fed into the rotary blade assembly. The chipper may be carried on a separate trailer or may be part of a truck, and in both cases the chips are ejected by the air flow created by the rotary blade assembly (if desired supplemented by a centrifugal fan).

In the past, wood chippers have normally been driven by chains or belts. Attempts have been made to drive the wood chippers by hydraulic motors, but it was found that when the pump driving the hydraulic motor of the chipper was stopped, the momentum of the heavy chipper rotor caused the hydraulic motor driving the rotor to coast for a substantial interval before it came to a stop. During this coasting interval, with the source of hydraulic fluid shut off, the motor cavitated, overheated and tended to burn out. Attempts were made to overcome this problem by providing brakes which were applied automatically as soon as the pump was stopped, in order to bring the motor to a rapid halt. However, such braking systems have been expensive and have not worked well.

Accordingly, it is an object of this invention to provide, for a hydraulic motor, a hydraulic safety circuit which will reduce the likelihood of motor burnout when the pump which pressurizes fluid for the motor is stopped. In a preferred embodiment of the invention, this is achieved by providing a conduit extending between the motor outlet and the motor inlet, with a check valve arrangement which shuts off normal fluid flow from the motor outlet to the fluid reservoir when the pump is shut off and which instead diverts the fluid through the above noted conduit back to the motor inlet. This permits fluid to circulate through the motor as the motor coasts to a stop. Since the motor is thus supplied with fluid during the coasting interval, the likelihood of cavitation and motor burnout during this interval is much reduced.

Figure 2:
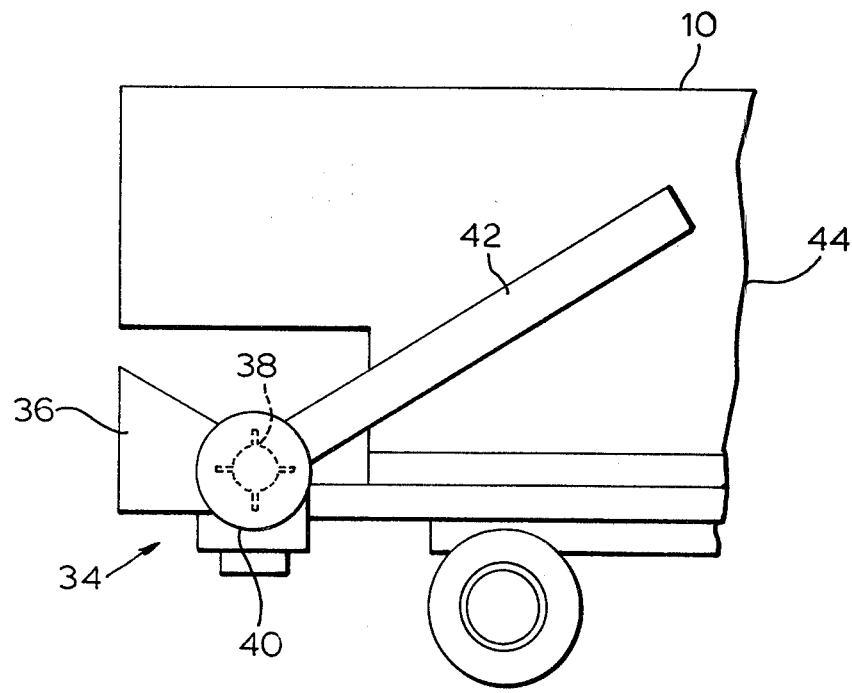

Further objects and advantages of the invention will appear from the following description, taken together with the accompanying drawings, in which:

FIG. 1 is a schematic diagram illustrating a hydraulic safety circuit according to the invention, and FIG. 2 is a diagrammatic side view showing a wood chipper embodying the hydraulic circuit of the invention and mounted on a truck.

Reference is first made to FIG. 1 which shows a hydraulic fluid reservoir 2, from which hydraulic fluid is drawn through a suction conduit 4 to a pump 6. The pump 6 is typically powered from the power take-off fitting 8 of a truck 10 (FIG. 2). From the pump 6, the fluid travels at substantial pressure, typically 1100 psi, through a conduit 12 to the inlet 14 of a hydraulic motor 16.

The fluid entering the inlet 14 drives the motor 16 at a substantial speed, and then emerges at a motor outlet 18. From the outlet 18 the fluid travels through a conduit 20 to a check valve 22. The fluid passes through the check valve 22 (the arrows in the drawing show the direction of permitted fluid flow), and then through a return conduit 24, a return filter 26, and then to the reservoir 2 (usually entering the reservoir at its top). A relief valve 28 bypasses the motor circuit in case the motor or its load should jam.

In addition, a further conduit 30 is provided to connect the motor inlet and outlet. The conduit 30 contains a second check valve 32 which allows fluid flow in the direction of the direction of the arrow marked on the drawing under appropriate pressure conditions, as will be described.

The hydraulic motor 16 is connected to a wood chipper 34 which is also shown diagrammatically in FIG. 2 as mounted on the vehicle 10. The chipper 34 includes a feed inlet 36, a heavy rotor blade assembly 38 which rotates inside a blade housing 40, and an exit chute 42 through which chips are blown into and stored in the body 44 of the vehicle 10. The chips may also be exhausted externally if desired.

The operation of the apparatus described is as follows. When the vehicle power take-off 8 is operated, the pump 6 is driven and pumps pressurized hydraulic fluid through the conduit 12 into the motor inlet 14. This drives the motor 16 at a relatively high speed (typically between 2000 and 3000 rpm for a wood chipper), driving the chipper rotor 38 (which is rigidly connected to the motor shaft) at the same speed. Brush and small logs may then be fed into the chipper feed inlet 36, where they will be converted into chips and exhausted through the outlet 42. Spent hydraulic fluid from the motor outlet 18 will travel through the conduit 20 and check valve 22 back to the reservoir.

The check valve 22 has an operating pressure typically of 50 psi, so that spent fluid from the motor outlet 18 can pass through the return conduit 24 only so long as its pressure exceeds 50 psi. However, while the pump 6 is operating, the pressure at the motor outlet typically is at least 70 psi, since there must be sufficient pressure at the outlet to overcome losses in the return conduit and return filter and to overcome the head of oil in the reservoir 2. The check valve 22 therefore does not interfere with normal operation.

As soon as the pump 6 is shut off, the pressure at the motor inlet tends to drop essentially to zero. However, the momentum of the heavy rotating chipper rotor 38 causes the motor 16 to continue to coast for a substantial interval, typically 180 seconds. During this coasting interval, the motor acts as a pump, generating a pressure rise of 7 to 10 psi across it. The resultant pressure at the motor outlet 18 is less than 50 psi, so that the check valve 22 closes when the pump 6 is shut off.

However, the check valve 32 is set to open when the pressure at the motor outlet 18 exceeds that at the motor inlet 14 by 5 psi. The check valve 32 now opens immediately after the closing of the check valve 22, and hydraulic fluid flows through the circuit consisting of conduit 30 and check valve 32, the motor inlet 14, the motor 16, and the motor outlet 18. Fluid continues to flow through this circuit as the motor coasts, until the motor slows down sufficiently that the pressure differential between the motor outlet and the motor inlet is less than 5 psi. At this time the check valve 32 closes. By this time the speed of the motor 16 has dropped sufficiently that there is little or no likelihood of cavitation, and the extra impedance to rotation created by the closing of valve 32 causes the motor to stop almost instantly.

Because of the action of the safety circuit comprising the conduit 30 and check valves 22, 32, the problem of the hydraulic motor during the coasting interval is much reduced, and consequently the likelihood of motor burnout is much reduced. The simple circuit described, consisting of two check valves and a short length of conduit, is considerably less expensive than a braking system for the motor and operates reliably and virtually instantaneously when required.

The invention has been operated successfully with the following equipment.

Chipper components: manufactured by Asplundh Chipper Company of Chalfont, Pennsylvania, U.S.A.

Pump: Tyrone No. 20400 CID driven at 1720 rpm and pumping approximately 60 gallons per minute at this speed.

Hydraulic Motor: Tyrone No. M20250-3D driven at approximately 2750 rpm at 60 gallons per minute.

Relief Valve: Yuken No. BT-10H-10 set at 2000 psi.

Check Valve 22: Yuken No. CRT-10-50-20 set at 50 psi.

Check Valve 32: Yuken No. CRT-10-5-20 set at 5 psi.

Typical pressure ranges for the equipment are as follows:

Relief Valve 28: normal working pressure 1100 psi. : minimum working pressure 600 psi. : maximum working pressure 2000 psi.

Check Valve 22: normal working pressure 50 psi. : minimum working pressure 20 psi. : maximum working pressure 75 psi.

Check Valve 32: normal working pressure 5 psi. : minimum working pressure 1 psi. : maximum working pressure 55 psi.

If the pressure at which check valve 22 opens is designated p1, and the pressure at which check valve 32 opens is designated p2, then the preferred ratio of p1 to p2 is 10 to 1 for normal operation, 20 to 1 for minimum pressure operation, and 75 to 55 for maximum pressure operation.

It will be understood that the specific pressure values listed are all preferred values and ranges for operation with a wood chipper, and other values may be used as required by the application. Concerning the 5 psi shut-off for valve 32, it has been determined in the equipment tested that when the pressure generated by the motor 16 during coasting has fallen to 5 psi, the motor is turning relatively slowly, and when valve 32 closes at the 5 psi pressure differential, the motor then stops almost immediately. In other words, the fluid acts as a brake as soon as check valve 32 closes, and the motor's momentum at this point is not sufficient to keep the motor coasting and cause cavitation. If a lower shut-off point for valve 32 were used, the motor would simply coast for a longer interval.

It will be appreciated that although this invention has been described in connection with a brush or wood chipper, and is particularly advantageous in that regard since it solves long standing problems in wood chippers, the invention can also find secondary application in any hydraulic motor connected to equipment having sufficient stored kinetic energy to cause the motor to coast appreciably after the pump which drives the motor is shut off.

We claim:

1. A hydraulic safety circuit for a hydraulic motor adapted to be driven from a source of pressurized hydraulic fluid, said circuit comprising:

a inlet means associated with said motor for admitting said fluid to said motor to drive said motor, said fluid entering said motor being at a first pressure, b outlet means associated with said motor for removing said fluid from said motor, said fluid leaving said motor at said outlet means being at a second pressure, said first pressure being higher than said second pressure when said fluid is driving said motor, said second pressure being higher than said first pressure when said source is shut off and said motor is coasting, c first conduit means for conducting spent fluid from said outlet means, d second conduit means connecting said inlet means and said outlet means, e and check valve means associated with said first and second conduit means and responsive to said first and second pressures for directing fluid from said outlet means through said first conduit means when said fluid is driving said motor and said first pressure is higher than said second pressure and for directing fluid from said motor through said second conduit means and hence back to said inlet means of said motor when said second pressure is higher than said first pressure, whereby when said source is shut off to shut said motor off, and when said motor is coasting so that said second pressure is higher than said first pressure, said fluid may circulate through said motor, through said outlet means, through said check valve means, through said second conduit means back to said inlet means, and again through said motor, whereby to supply said motor with fluid during coasting and hence to reduce the likelihood of motor burnout during coasting.

2. Apparatus according to claim 1 wherein said check valve means comprises first and second check valves, said first check valve being mounted in said first conduit means and permitting fluid flow through said first conduit means at pressures higher than a predetermined pressure, said predetermined pressure being lower than said second pressure when said source is operative and said fluid drives said motor and being higher than said second pressure when said source is disconnected from said motor and when said motor is coasting, said second check valve being located in said second conduit means, said second check valve blocking flow of fluid through said second conduit means from said motor inlet to said motor outlet means and permitting flow of fluid through said second conduit means from said motor outlet means to said motor inlet means when said second pressure exceeds said first pressure by a predetermined difference pressure.

3. Apparatus according to claim 2 wherein the ratio of said predetermined pressure to said predetermined difference pressure is between 20 to 1 and 75 to 55.

4. Apparatus according to claim 3 wherein said predetermined pressure is between 20 and 75 pounds per square inch and said predetermined difference pressure is between 1 and 55 pounds per square inch.

5. Apparatus according to claim 1 and including means for energizing said source to provide fluid to said motor at a pressure and flow sufficient to drive said motor at a speed of at least 2000 revolutions per minute.

\* \* \* \* \*